United States Patent [19]

Pezeshki et al.

[11] Patent Number: 5,222,071
[45] Date of Patent: Jun. 22, 1993

[54] DYNAMIC OPTICAL GRATING DEVICE

[75] Inventors: Bardia Pezeshki, Huntington Beach; James S. Harris, Jr., Stanford, both of Calif.

[73] Assignee: Board of Trustees Leland Stanford, Jr. University, Stanford, Calif.

[21] Appl. No.: 660,203

[22] Filed: Feb. 21, 1991

[51] Int. Cl.[5] .............................................. H01S 3/10
[52] U.S. Cl. ...................................... 372/26; 372/20; 372/22; 372/45; 372/50; 257/21; 359/318
[58] Field of Search ...................... 372/22, 50, 45, 102, 372/20, 26; 357/4

[56] References Cited

U.S. PATENT DOCUMENTS

| 4,546,244 | 10/1985 | Miller | 372/45 |
| 4,868,835 | 9/1989 | Iwanade | 372/26 |
| 4,913,525 | 4/1990 | Asakura et al. | 372/102 |
| 5,003,550 | 3/1991 | Welch et al. | 372/102 |
| 5,023,878 | 6/1991 | Berthold et al. | 372/26 |
| 5,048,029 | 9/1991 | Skupsky et al. | 372/26 |

FOREIGN PATENT DOCUMENTS 8500472  1/1985  PCT Int'l Appl. .................... 372/26

OTHER PUBLICATIONS

Shams et al, "Monlithic Integration of GaAs-(GaAl)As Light Modulators and Distributed-Bragg-Reflector Lasers", App. Phys. Lett., 32(5), Mar. 1978, pp. 314–316.

Pezeshki et al.; "Optimization of modulation ratio and insertion loss in reflective electroabsorption modulators" Applied Physics Letters, vol. 57 (Oct. 8, 1990); pp. 1491–1492.

Froberg: "rpp GHZ electrically steerable conducting antenna array"; Applied Physics Letters, vol. 58 (Feb. 4, 1991); pp. 446–448.

Applied Physical Letters, vol. 52, p. 1116.

"Quantum Well Optoelectronic Switching Devices", International Journal of High Speed Electronics, vol. 1, No. 1 (1990), 19–46.

Primary Examiner—Georgia Y. Epps
Attorney, Agent, or Firm—Rosenblum, Parish & Isaacs

[57] ABSTRACT

The invention relates to an apparatus including a semiconductor grating whose optical properties can be changed electrically in order to steer a diffracted laser beam with no moving parts. Lithographically defined portions, stripes or areas formed in a semiconductor quantum well region used in association with selectable voltage supply means enable control of the optical characteristics of the grating. The optical properties of the semiconductor quantum well region vary in response to variations in voltage applied to the areas which in turn change the transmissivity or reflectivity of the areas. By selectively applying voltages, the diffraction pattern obtained in the far-field from illuminating the areas is thus controlled and beam steering results. By using a two-dimensional array of areas, or alternatively using two such one dimensional arrays, beam steering in two dimensions may be accomplished. Using a Fabry-Perot cavity allows large reflectivity changes to occur from the absorption changes, and another external Fabry-Perot cavity increases the optical power steered into the diffracted modes. Electronically addressing a large number of areas can be achieved using a number of standard methods.

31 Claims, 20 Drawing Sheets

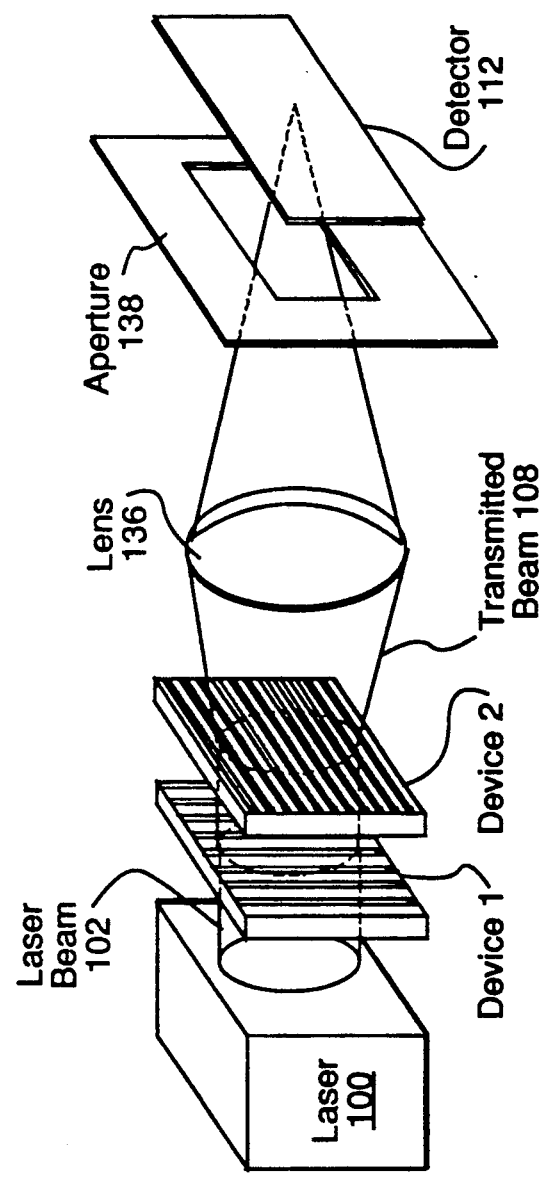

DYNAMIC OPTICAL GRATING DEVICE

This invention was made with Government support under contracts N00014-14-K-0077 and N00014-89-K0067 awarded by the Office of Naval Research. The Government has certain rights in this invention.

BACKGROUND OF THE INVENTION

1. Field of the Invention

This invention relates generally to optical devices, and more particularly to an improved optical grating device and system employing electrical means to control the direction or spatial patterns of optical beams.

2. Brief Description of the Prior Art

Devices for controlling the direction of an optical beam or the spatial patterns of illumination produced by a laser have been very limited in the past, and confined almost entirely to mechanical methods, such as galvanic mirrors. An alternative method and apparatus whereby this spatial control could be performed electronically with no moving parts would allow much faster and more reliable control of optical beams.

Spatial light modulators, devices in which optical properties of the material are spatially controlled, have previously been very large compared to the wavelength of light, and have therefore been useless for obtaining diffraction patterns. Present semiconductor technology, however, allows the use of quantum well devices to make much smaller spatial light modulators where diffraction effects dominate. Since these devices are intrinsically very fast, and can be made lithographically, they are useful in rapidly controlling far-field patterns of illumination and obtaining beam steering through diffraction. These devices can work in transmission mode, where the light passes directly through the quantum well region, or in reflection mode, where external or integrated mirrors are used to enhance reflectivity changes and contrast.

SUMMARY OF THE INVENTION

A presently preferred embodiment of the invention includes a semiconductor optical grating device wherein the optical properties of the device material are controlled spatially by applying a voltage to defined areas. By using a semiconductor quantum well material, whose optical properties such as refractive index and absorption coefficient depend on the electric field, optical properties can be changed independently in each area. Since the dimensions of the defined areas are on the order of the wavelength of light, strong diffraction effects occur to produce changes in the far-field optical pattern. Consequently, electronic control of the far-field pattern is obtained with no moving parts.

BRIEF DESCRIPTION OF THE DRAWINGS

FIG. 8a is a plot of intensity versus position for deflected beams;

FIG. 8b is a lifting of patterns of reflectivity imposed upon the stripes to achieve the results illustrated in FIG. 8a;

FIG. 20 is a schematic showing how two transmission mode devices can be used for x-y scanning.

DETAILED DESCRIPTION OF THE PREFERRED EMBODIMENTS

Figure 1:
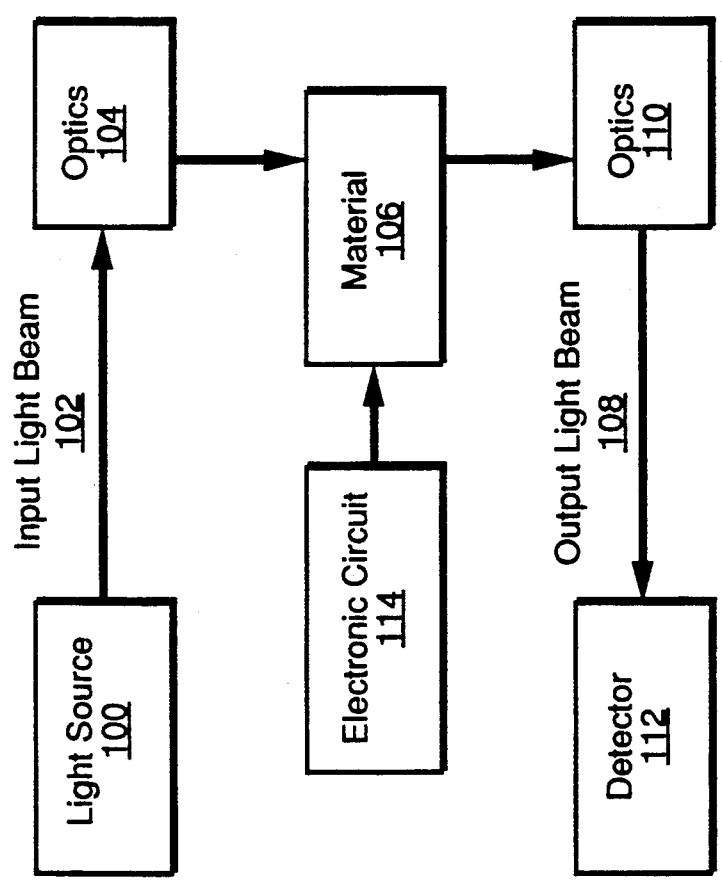
FIG. 1 is a schematic diagram showing the invention.

FIG. 1 is a generalized block diagram showing an exemplary embodiment of the invention. A light source 100 generates an input light beam 102 which is then modified by optics 104 to impinge upon a block of grating material 106. The output light beam 108 is again modified by output optics 110 to focus on a detecting device 112. The properties of material 106 are controlled by an electronic circuit 114 which can be partially or entirely integrated with the material 106, or can be completely separated.

The optical characteristics of the material 106 must be such that the intensity or the phase of the output light beam changes with applied bias supplied by the electronic circuit 114. Material 106 must also be physically defined into independently controlled areas such as stripes or squares. The electronic circuit 114 will therefore be able to control independently the phase of intensity of the output light resulting from the illumination of each defined area. If the impinging illumination upon the material 106 is coherent, a diffraction pattern will be obtained in the far-field. This diffraction pattern can be calculated by many methods, a simple approximation being the Huygens-Fresnel integral:

$$\widetilde{E}(x, y, z) = j \frac{e^{-jk(z-z_0)}}{(z-z_0)\lambda} \int \int \widetilde{E}_0(x_0, y_0, z_0) \exp\left[-jk \frac{(x-x_0)^2 + (y-y_0)^2}{2(z-z_0)}\right] dx_0 dy_0$$

where the left hand side of the equation represents the complex electric field of the optical beam at the output coordinates x, y, z. $E_0$ represents the complex electric field of the output beam 108 at the position of the material 106. k and λ represents the wave number and wavelength of the optical beam respectively, and the integral is carried out over the two transverse coordinates of the material 106, $x_0$ and $y_0$. In the limit where the object 106 is placed at $z_0=0$, and that the coordinates in the far-field are much larger than the spatial coordinates of the object, then this becomes a simple two-dimensional Fourier Transform:

$$I(x, y, z) = \frac{1}{2\pi} |\int \int \widetilde{E}(x_0, y_0) e^{-j\Omega_x x_0} e^{-j\Omega_y y_0} dx_0 dy_0|^2$$

where I is the intensity at the far-field and $$\Omega_x = \frac{-2\pi}{\lambda}\left(\frac{x}{z}\right) \text{ and } \Omega_y = \frac{-2\pi}{\lambda}\left(\frac{y}{z}\right)$$

represent the frequencies.

Figure 2:
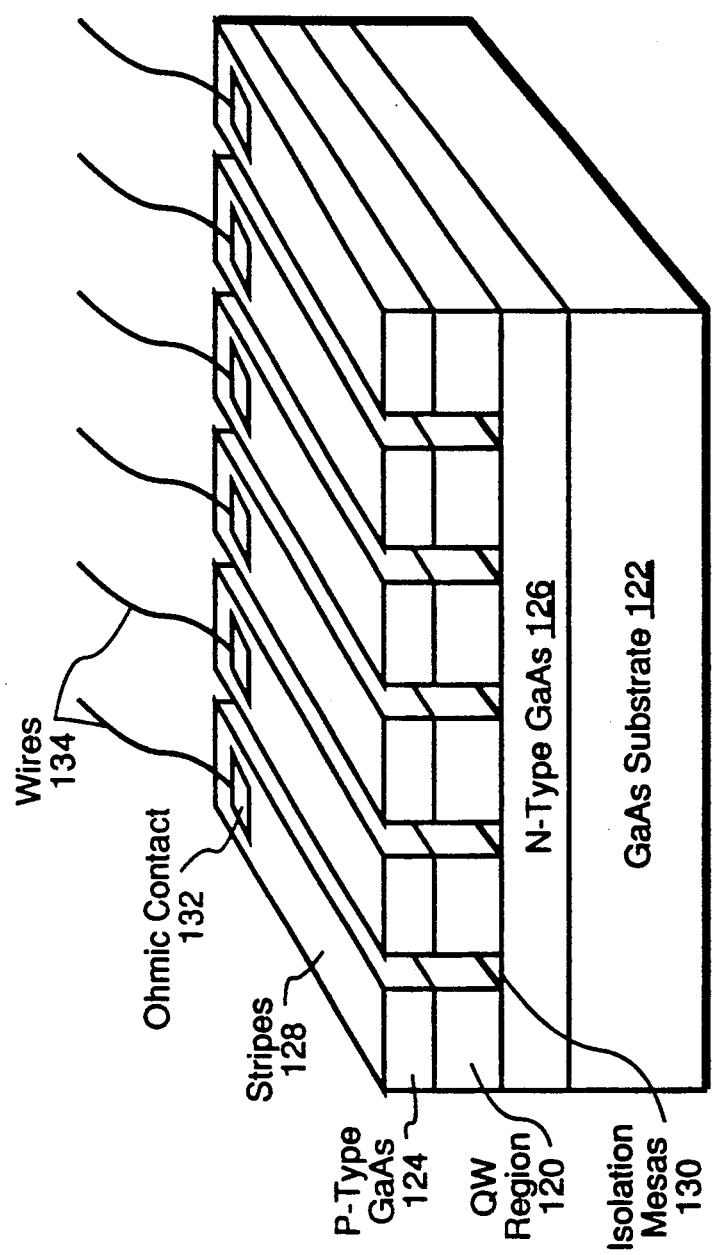
FIG. 2 is a schematic diagram of the beam deflecting
Figure 3:
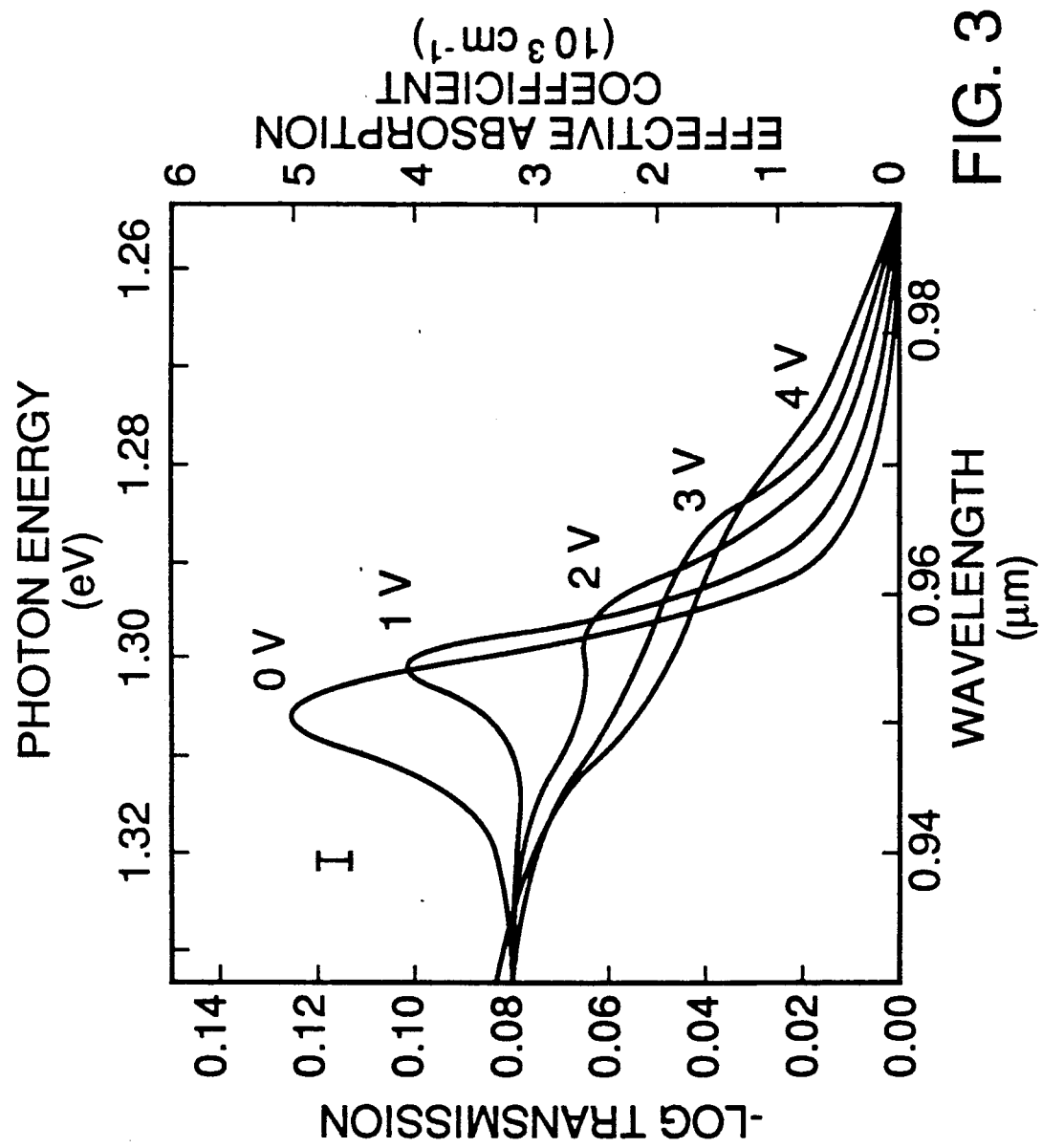
FIG. 3 is a typical plot of the absorptive properties of quantum wells as a function of wavelength for various applied biases.

An example of an exemplary embodiment of material 106 is shown in FIG. 2 and comprises a number of quantum wells (QWs) 120 of indium gallium arsenide (InGaAs) grown upon a gallium arsenide (GaAs) substrate 122. This structure is generally similar to those characterized in prior art, such as in Applied Physics Letters vol. 49, p. 135. Here the quantum wells are thin enough to exhibit quantum confinement and the optical absorption properties of the quantum wells are dependent on he applied electric field. Typical optical absorption properties for various electric fields are shown in FIG. 3. The quantum wells are sandwiched between a top p-type GaAs layer 124 and a bottom n-type GaAs layer 126. A reverse bias applied to such a structure changes the electric field in the intrinsically doped quantum well region 120.

Figure 4:
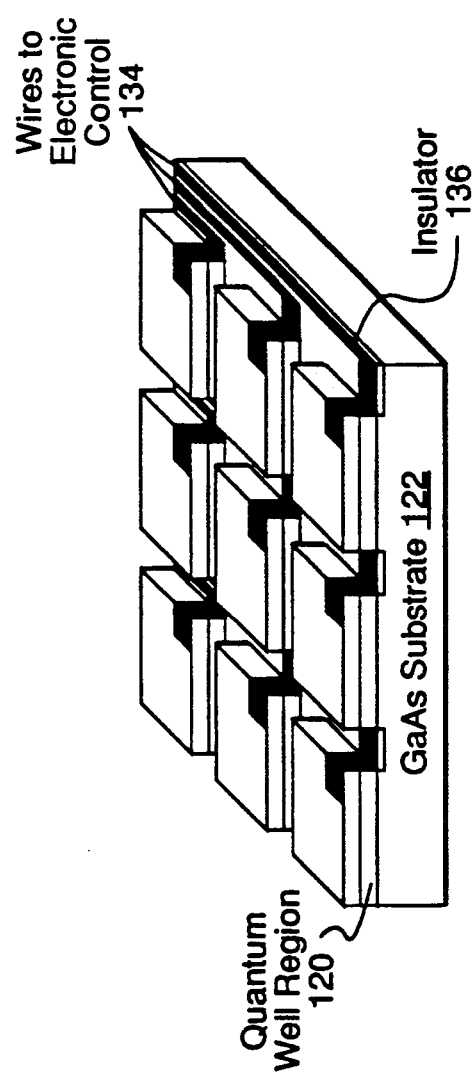
FIG. 4 is a schematic of the invention using square regions to obtain two dimensional beam control.

In accordance with the present invention, the surface of the epitaxially grown region is lithographically defined into stripes 128, and isolation mesas 130 are etched. The depth of the mesa 130 is enough to electrically isolate each stripe. An ohmic metal contact pad 132 is lithographically defined and evaporated at the end of each stripe, and wires 134 connect each contact pad to the drive electronics 114 (FIG. 1). Since the top of each stripe is heavily doped and p-type, the voltage across the whole stripe is a constant and is controlled by the voltage applied at the contact pad. To increase the conductivity of the top layer for use with higher optical powers, a transparent contact such as indium-tin-oxide (ITO) can be applied across the length of the whole stripe. Metal lines that only partially cover the stripe can also be used, though they will decrease efficiency. In this embodiment, since the areas are defined as stripes, the far-field intensity profile can be changed in one dimension only, and as previously discussed, the far-field intensity pattern depends on the Fourier Transform of the spatial reflectivities. To obtain a two-dimensional Fourier Transform, we need to be able to vary the spatial variance of reflectivity in two dimensions. Consequently, using squares instead of stripes is a logical alternative. FIG. 4 shows a typical embodiment of this idea. In this case the quantum well material is identical to FIG. 3, but the wafer is patterned into squares instead of stripes. Contacting such an array can be difficult. However, for small arrays, simply depositing metal lines on an insulating layer 136 will be sufficient. We shall discuss the issue of more complex addressing schemes later in this document.

Figure 5:
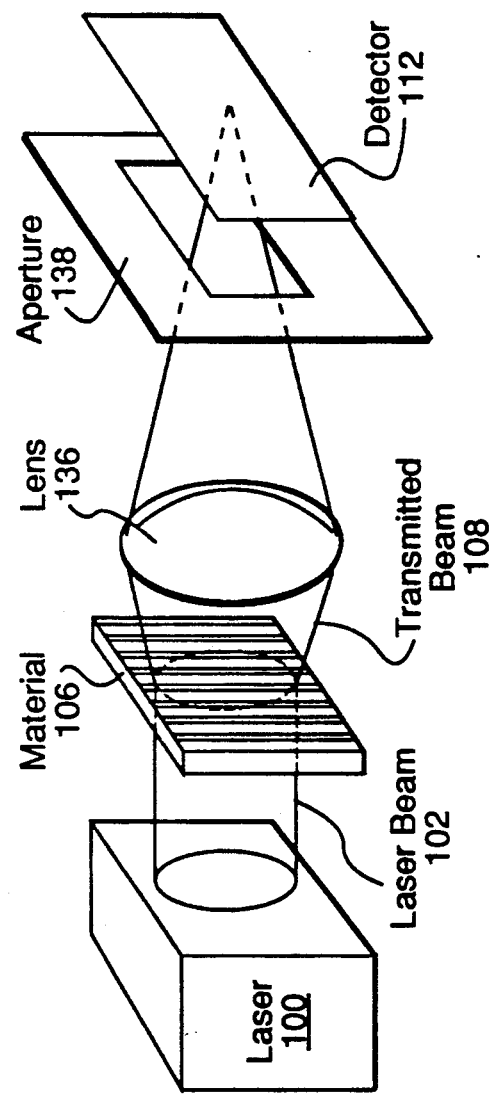
FIG. 5 is a schematic of an embodiment where striped regions on the device lead to beam deflection in one dimension.

An application of this embodiment for laser beam steering (for example to scan a laser beam for a laser printer) is schematically shown in FIG. 5. A laser 100 outputs a collimated beam 102 that impinges on the material 106. The transmitted beam 108 is focused by a simple lens 136 and is spatially cut off by an aperture 138. These two elements make up the output optics 110 shown previously in FIG. 1. Only the first order diffracted beam is allowed through the aperture 138 to fall upon the screen or detector 112. If the spatial frequency of the stripes in the transmissive state is now changed by the controlling electronics 114, the angle that the beam is scanned will also be changed. Suppose that the material is configured exactly the same as the material in the previous reference with characteristics shown in FIG. 3, and that the apparatus is operated at wavelength 0.95 μm. As a bias voltage is applied to each lithographically defined region, the absorption is reduced, and the intensity of the transmitted light increases, turning the area on. If a stripe geometry is used, as in FIG. 3 with each stripe 2 μm wide and with a 1 μm isolation mesa, then one can simply compute the deflection angles of the output beam. For example, an on-off-on-off-on pattern would have an effective grating spacing of d=6 μm and would produce a deflected beam at 9.11 degrees (given by well-known diffraction formula d*sin(angle)=-wavelength). Similarly, an on-on-off-off-on-on-off-off pattern would have an effective grating spacing of d=12 μm and lead to deflection at 4.54 degrees. Of course, the stripes can also be in the intermediate states of being partially on. This additional degree of freedom would increase the amount of optical power in the fundamental mode and thereby increase the overall efficiency. Simple diffraction theory governs the scanning rules and in this case a continuous scanning range between zero and 9.11 degrees can be achieved by changing the spatial frequency. The function of the aperture 138 is to block all diffracted beams outside this angular range, since there will also be higher order diffraction modes. The angular width of the diffraction mode is defined as the resolution of the instrument and increases as the number of stripes increases. From well-known grating theory we know that this angular width of the resonance is equal to the wavelength divided by the total width of the grating.

Figure 6:
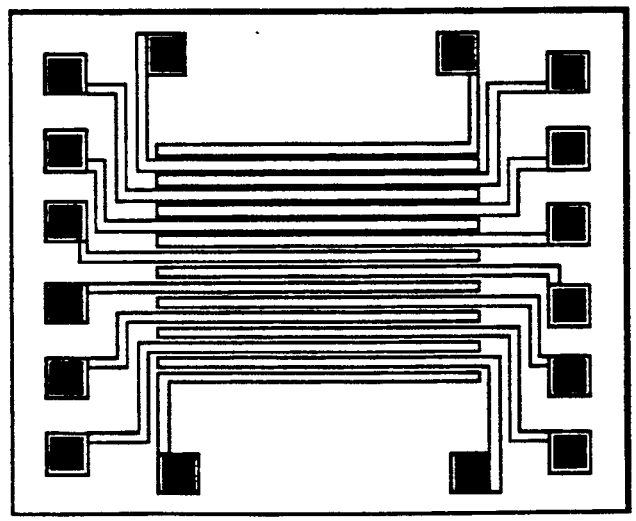
FIG. 6 is a photograph of the fabricated wafer used to demonstrate this invention.

An embodiment of the invention working in the reflection mode was fabricated in the gallium arsenide/aluminum gallium arsenide system (GaAs/AlGaAs). The reflective mode is preferred for two reasons. Since in this material the substrate is opaque to the appropriate wavelength, constructing a transmissive device would require the removal of the substrate. Furthermore, by working in the reflection mode, one can obtain higher contrast and lower loss due to the interaction of the Fabry-Perot cavity with the quantum wells. The epitaxial growth of the material is explained in depth in Applied Physics Letters, vol. 57, p. 1491. In brief, the material was grown on an n-type GaAs substrate using molecular beam epitaxy (MBE). The mirrors composing the Fabry-Perot cavity consisted of ¼ wave stacks of aluminum arsenide (AlAs) and AlGaAs. The bottom mirror was n-doped and had a calculated reflectivity of 98.8%, while the top mirror was p-doped with a reflectivity of 50.3%. The cavity contained 19 quantum wells that were left undoped. The total reflectivity of the device changed from about 10% to 76% when a 5-volt bias was applied. In this embodiment of the invention a wet-etching technique was used to fabricate 15 stripes, each 10 μm wide and with a 2 μm wide mesa. The stripes were ii individually contacted with an ohmic contact around the edge of the wafer. FIG. 6 is a photograph of the fabricated device.

Figure 7:
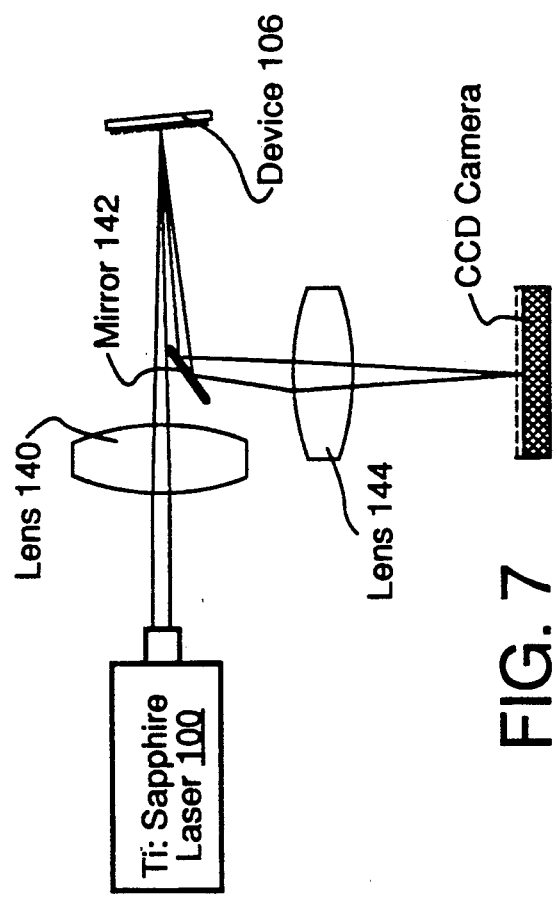
FIG. 7 is a schematic set up used to demonstrate this invention.
Figure 8:
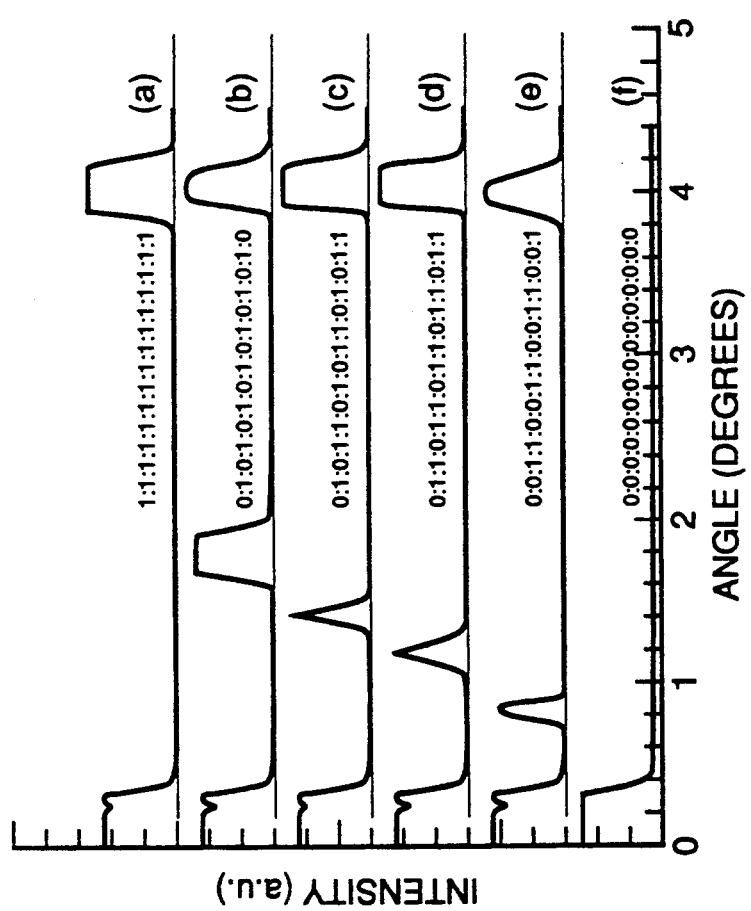
Figures 8A, 8B:
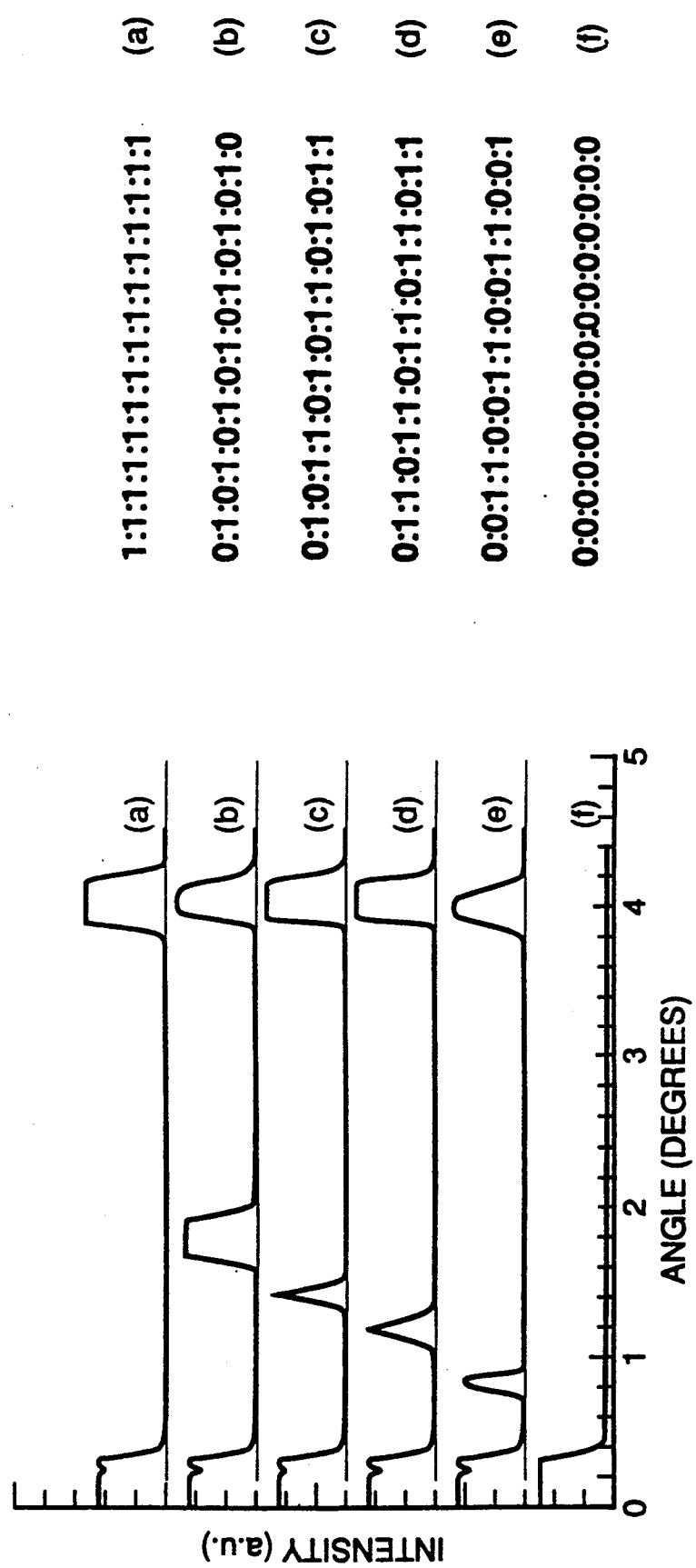

The device was tested using a tunable Ti:Sapphire laser. FIG. 7 is a schematic of the experimental apparatus. A 20 cm focal length lens 140 focused the laser beam onto the device 106. when illuminating the device, it is important to have a large enough spot size to illuminate as much of the stripes as possible without getting reflections from other parts of the wafer, such as the contact pads. In this case, the reflected beam was deflected with a small mirror 142 onto an imaging lens 144 and a silicon CCD camera 112. The contact pads of device 10 were wire-bonded onto a package (not shown), and an external bias could be applied to the stripes. The experimental results are displayed in FIG. 8a. In the figure a "1" implies a reflective state, and a "0" implies a non-reflective state. In the first plot, where all the elements are in a reflective state, the main reflected peak appears at the left and a peak corresponding to the spatial frequency of the isolation mesas is to the right. Since this peak is due to the reflectivity difference between the mesas and the stripes, it occurs with differing intensity in almost all plots. Had the mesas been smaller in size, this peak would have been correspondingly reduced. The main reflected peak on the left is due to the DC reflectivity value of the pattern, and is the main power loss mechanism. In the second plot (b) the pattern 0:1:0:1:0:1 . . . causes a main peak to occur in the center of the range. The position of this peak corresponds to the spatial frequency imposed on the striped and is twice the stripe period (24 μm). In the next three plots (c,d,e), the peak moves to the left as the spatial frequency decreases. The final plot (f) corresponds to all the elements in the off state, and only the main reflective peak appears. The peak due to the mesas disappears in this plot since the off state reflectivity corresponds roughly to the reflectivity of the mesa regions. FIG. 8a clearly demonstrates that beam steering is possible in accordance with the present invention.

Figure 9:
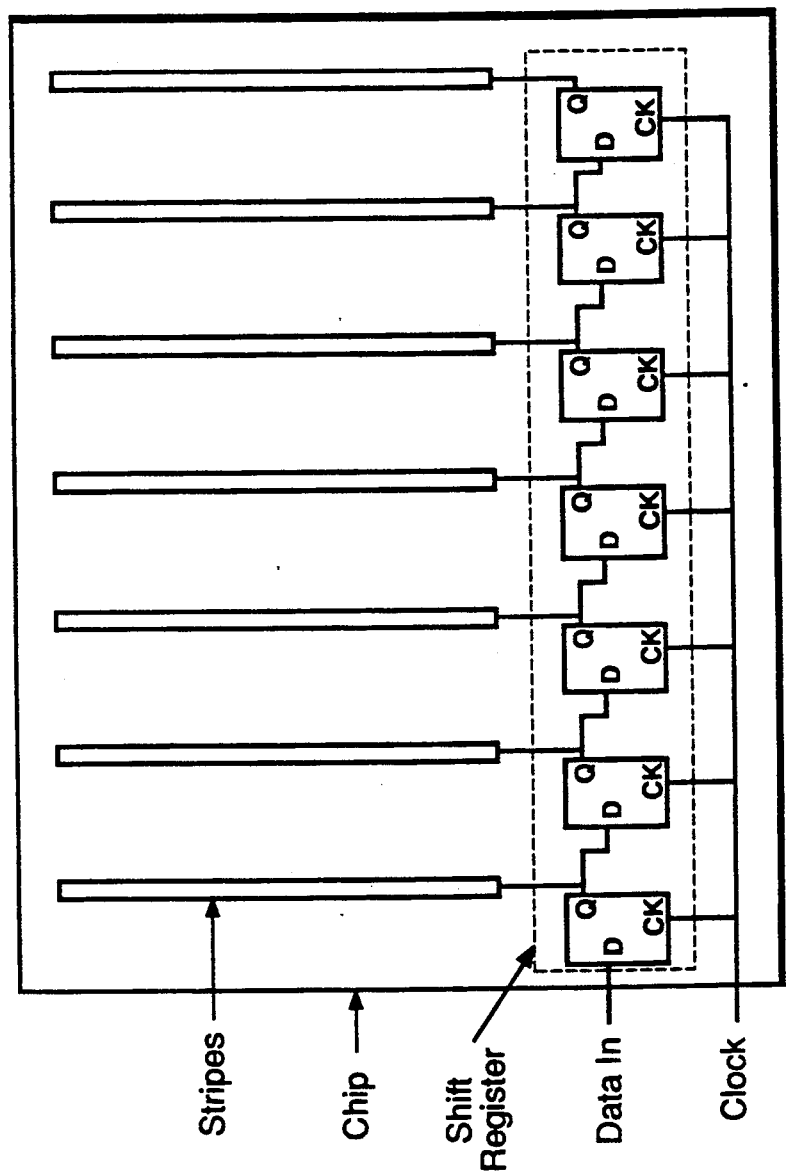
FIG. 9 is a schematic where a shift register is used for addressing multiple stripes.

There are a number of modifications that will increase the performance of the device. In the prototype embodiment, simple one-to-one connections were made to each stripe. To obtain better resolution, more stripes are required and would make the prototype form of addressing impractical. Since the semiconductor material is ideal for fabrication of drive electronics, it is possible to integrate drive electronics on chip. FIG. 9 shows an implementation where D-type flip-flops in a shift register configuration are utilized to decode serial information for the states of each stripe and apply the bias to each stripe. Alternatively, one could fabricate a large shift register to address all the stripes, or a number of smaller shift registers that would each address a smaller number of stripes. Each n-bit shift register would reduce the number of wires to the chip by n.

Figure 10:
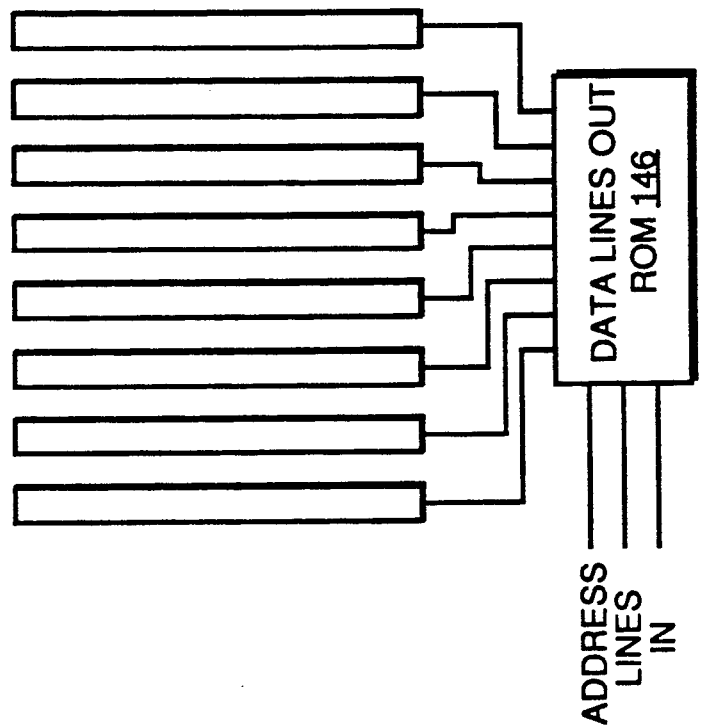
FIG. 10a is a ROM look-up table and FIG. 10b is a schematic diagram showing how an external Fabry-Perot cavity can increase the efficiency of the device.

One could also address the stripes using a read-only memory (ROM) in a look-up table configuration. This idea is shown schematically in FIGS. 10a and 10b. The look-up table corresponding to ROM 146 gives the output pattern corresponding to the input code. This is a typical pattern that might be used, where the increasing binary code corresponds to increasing frequency. This is similar to the demultiplexer logic, where n lines can address $2^n$ devices, in this case, the devices being the stripes.

To perform beam steering in two dimensions, a simple modification would be to make a two-dimensional array of devices, employing squares instead of stripes, as shown schematically in FIG. 4. In large arrays of this kind the addressing becomes much more complicated, since attaching discrete wires to a large matrix is impractical. By using transparent interconnects, such as ITO, layers of contact stripes separated by transparent insulators such as silicon dioxide would enable a greater matrix to be addressed. The gallium arsenide chip could also be inverted and placed on a fabricated silicon wafer with bonding pads in the correct position. In this case the reflection modulator would have to work from the substrate side, with either the substrate transparent (for example by using InGaAs wells), or with the substrate removed.

Figure 11:
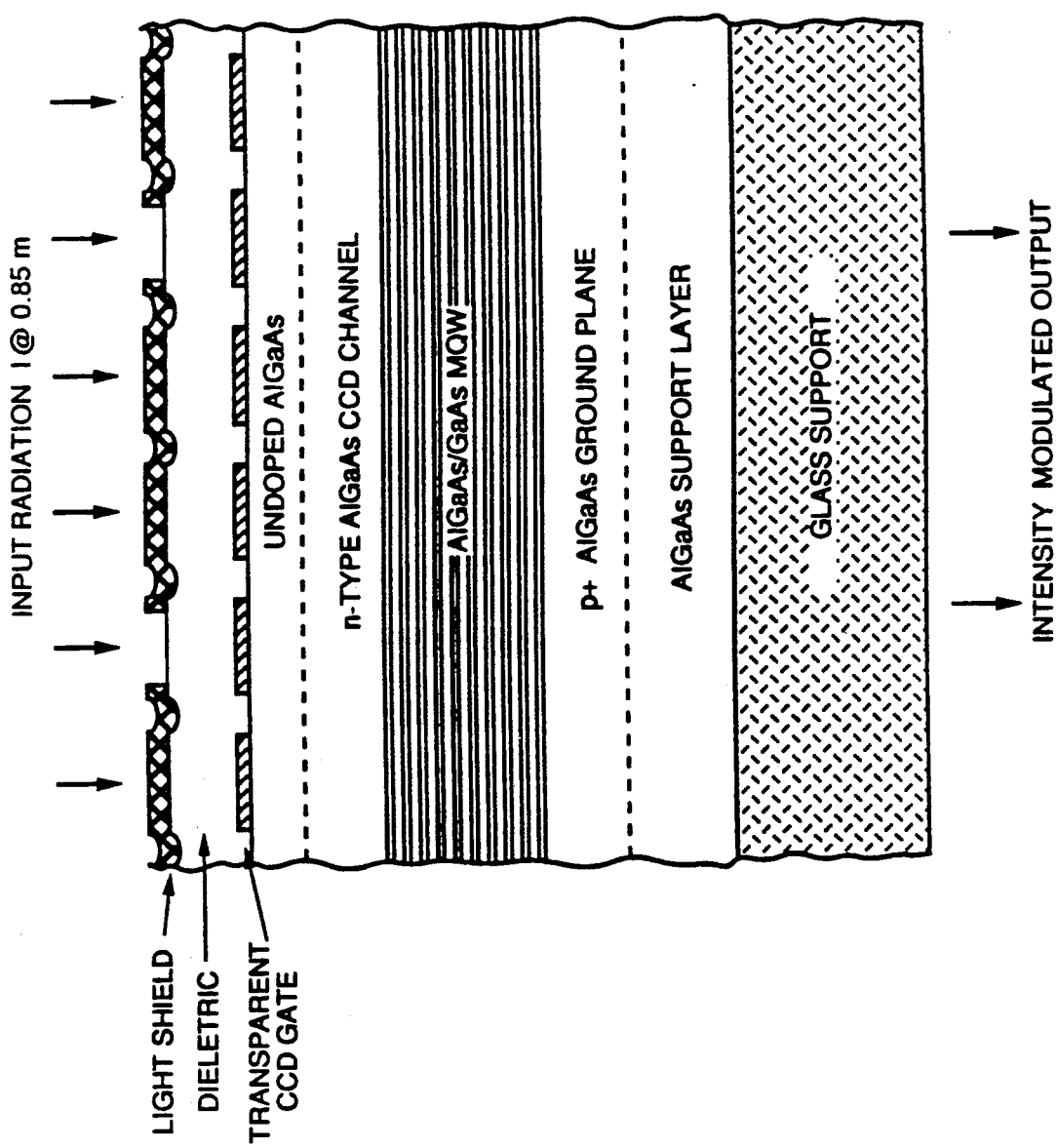
FIG. 11 is a cross-section schematic of a CCD addressing system incorporated with an electro-absorptive quantum well region.

One could alternatively use optical methods to address a large number of regions. For example, CCD technology has a well-established capability for low power and high speed. This ii form of addressing would make the information transfer to the chip optical instead of electronic, and very much faster. An experimental demonstration of such a technique is explained in Applied Physics Letters, vol. 52, p. 1116. FIG. 11 is a schematic of the device (from reference). Briefly, a conventional CCD structure is grown over a multiquantum well region, and the presence of pockets of charge in the CCD layer changes the electric field in the quantum wells and thereby changes the absorption. To set a particular region to a particular voltage, a specific amount of charge is first injected through an ohmic contact on the periphery, and clocked down to the appropriate place, moving to the adjacent contact on each clock pulse. Note that the CCD region is fabricate with AlGaAs, and is therefore transparent at the wavelength where the QW modulation occurs. Consequently, it does not decrease the intensity of the light to be modulated, nor are the pockets of charge change affected by this light.

Figure 12:
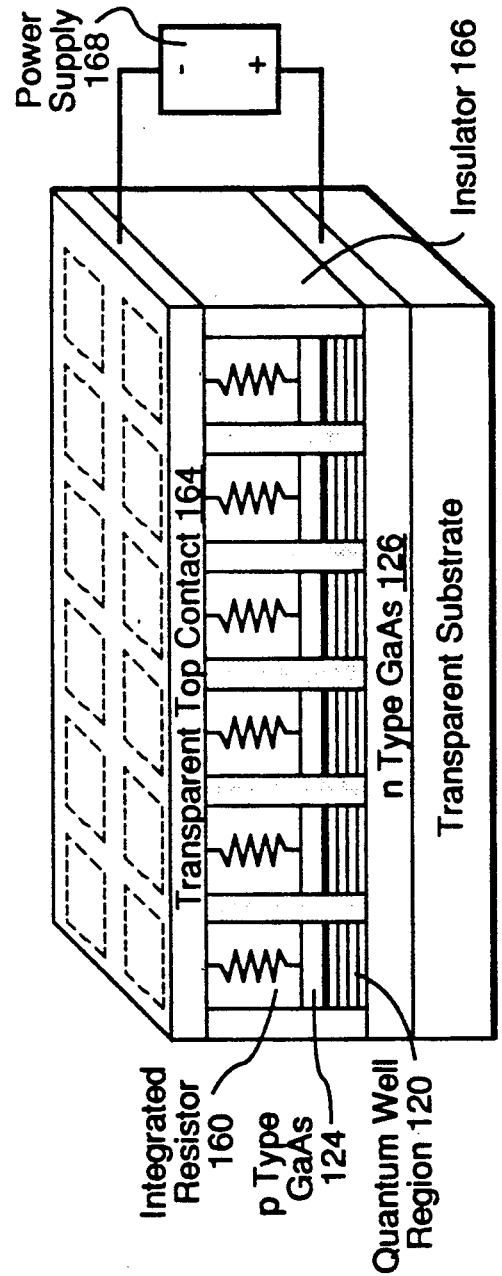
FIG. 12 is a schematic of a two dimensional array using SEED devices.

Optical addressing could also be performed using Self Electro-Optic Effect Device (SEED) technology. Integrated resistors to normally-off quantum well modulators can be fabricated in small sizes and exhibit optical bistability. An explanation of such operating principle and fabrication can be found in U.S. Pat. No. 4,546,244. A typical embodiment shown in FIG. 12 would be to fabricate a large array of SEEDs composed of many small squares with integrated resistors. The SEED itself is simply a normally-off transmission modulator with a bottom n-region 126, a top p-region 124, and an intrinsic quantum well region 120. Integrated with each modulator is a resistor 160. Only two electrical lines supplying bias to the device would be required, one to the substrate and a top contact 164 that addresses all devices. This contact would have to be transparent to allow optical input. All the devices would also have to be laterally isolated from one another with an electrically insulating material 166. To operate, a DC electrical bias may be applied uniformly to all the devices by an external voltage supply 168. An optical bias illuminating all the devices at a power level where the device has two stable states would enable the device. If an image were to be focused onto the array, some pixels would switch to the low transmission state, and stay in that state even when the focused image is removed. In the far-field one would obtain a two-dimensional Fourier Transform of the image. Since analytical methods of Fourier Transforms, especially in two dimensions are very computer intensive, this would provide a fast optical alternative.

Figure 13:
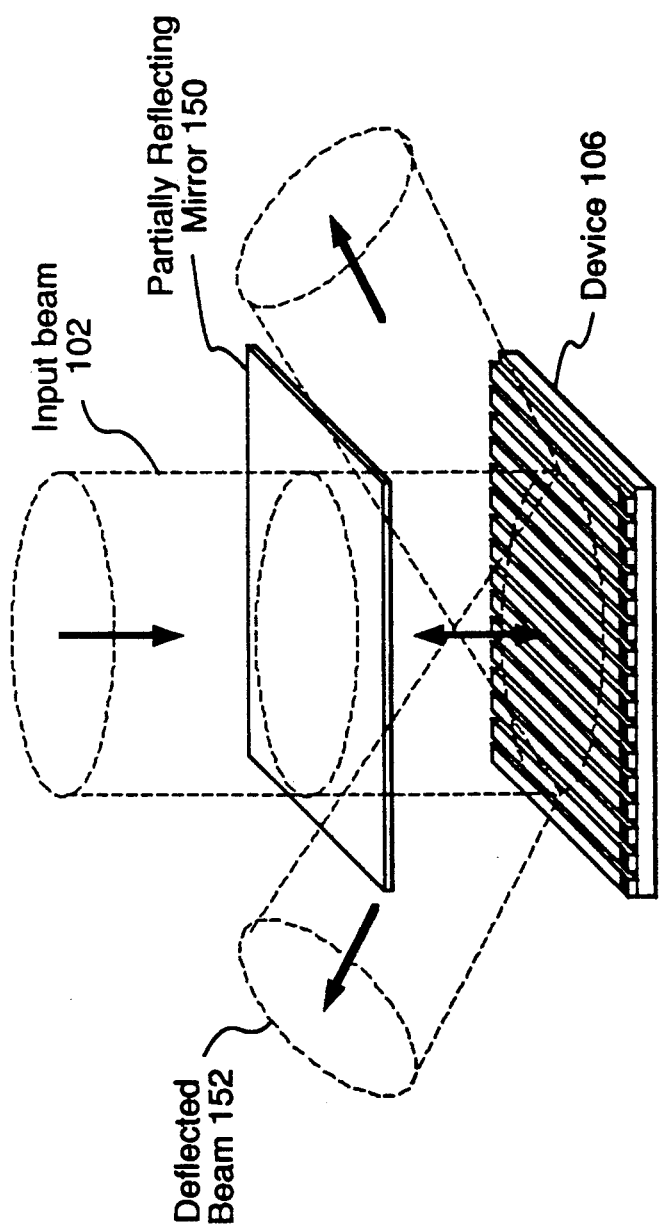
FIG. 13 is a schematic of reflective embodiment of the invention where a partially transmissive mirror is used to form an external Fabry-Perot cavity to reflect back the main lobe and increase efficiency.

There are also modifications to the optical set up that can improve the characteristics of the device. The main reflected lobe represents wasted power, since it can not be deflected electronically. By placing the device in a external Fabry-Perot cavity using a partially transmitting second mirror, the power in the main lobe can be recovered. FIG. 13 schematically depicts this embodiment. A partially reflecting mirror 150 is set to have the same reflectivity as the average reflectivity of the device 106, and placed an integral number of half wavelengths away to form an external cavity. The net result is that the beam directly reflected by the material 106 builds up inside this external cavity until it is deflected into a useful side order mode 152. If the reflectivity of the partially reflecting mirror 106 is correct, there will be no net reflection either from the main lobe or from mirror 150 back towards the light source.

Efficiency can also be increased by modulating the phase rather than by modulating the intensity of the output light from each area. In this case one would rely on refractive index changes in the quantum well region to modulate the phase of the output beam. One could also use other materials like ferroelectrics where the refractive index is a function of electric field to achieve the same effect. These phase modulators can also be integrated with intensity modulators to control both optical properties. In a typical example the light would first pass through quantum well region where the operating wavelength is close to the exciton, and electric fields would primarily influence the intensity, and then pass through a quantum well region where the operating wavelength is further from the exciton and the path length is therefore field dependent.

Figure 14:
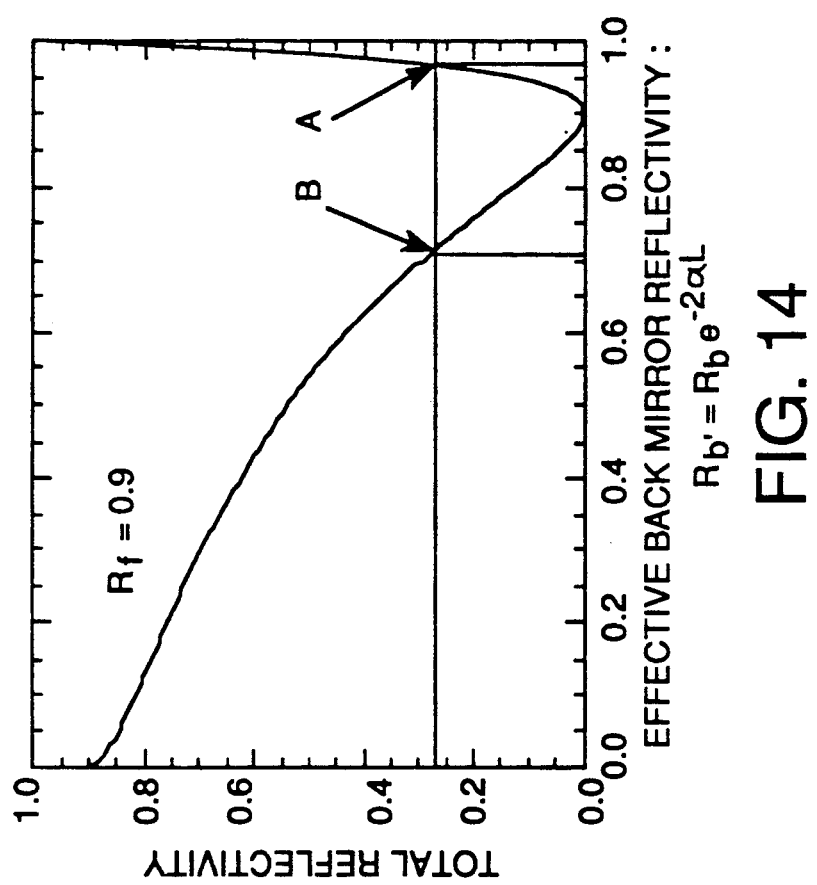
FIG. 14 is a plot of total device reflectivity versus effective back mirror reflectivity. It demonstrates how the phase of the reflection can be changed while the magnitude stays constant.

A practical way to implement a device where the reflected beam only changes phase by 180 degrees and stays the same in intensity is using a properly optimized reflection electroabsorption modulator. In such a device the total reflectivity of the device depends on the front mirror reflectivity $R_f$, the rear mirror reflectivity $R_b$, the round trip cavity absorption $e^{-2\alpha L}$, as follows:

$$R_T = \left( \frac{\sqrt{R_{b'}} - \sqrt{R_f}}{1 - \sqrt{R_{b'} R_f}} \right)^2$$

where $R_{b'} = R_b e^{-\alpha L}$, an effective back mirror reflectivity that takes into account cavity absorption. In conventional intensity modulators, the cavity absorption is changed from a low value where $R_{b'} > R_f$ to a high value where $R_{b'} = R_f$. When this matching condition is satisfied, the total reflectivity goes to zero, thus yielding a high contrast device. However, if the cavity absorption is changed from a specific value above this matching condition to another specific value below this condition, then the intensity of the reflected beam will remain constant, while the phase will switch by 180 degrees. FIG. 14 is a plot of total reflectivity as a function of $R_{b'}$ for $R_f=0.9$. As a numerical example, assume $R_b$ is almost 1 and $R_f=0.9$. Suppose also that the cavity absorption can be changed by a factor of 10, then by changing $\alpha L$ by a factor of 10 from $-0.033$ to $-0.333$, $R_{b'}$ is changed from 0.9672 to 0.7164, and although the total reflectivity stays at 0.269, the phase of the reflected beam changes by 180 degrees. This is shown on FIG. 14, as moving from point A to point B. Of course, higher efficiencies than 0.269 can be obtained by better quantum wells that can change $\alpha L$ by larger amounts.

Figure 15:
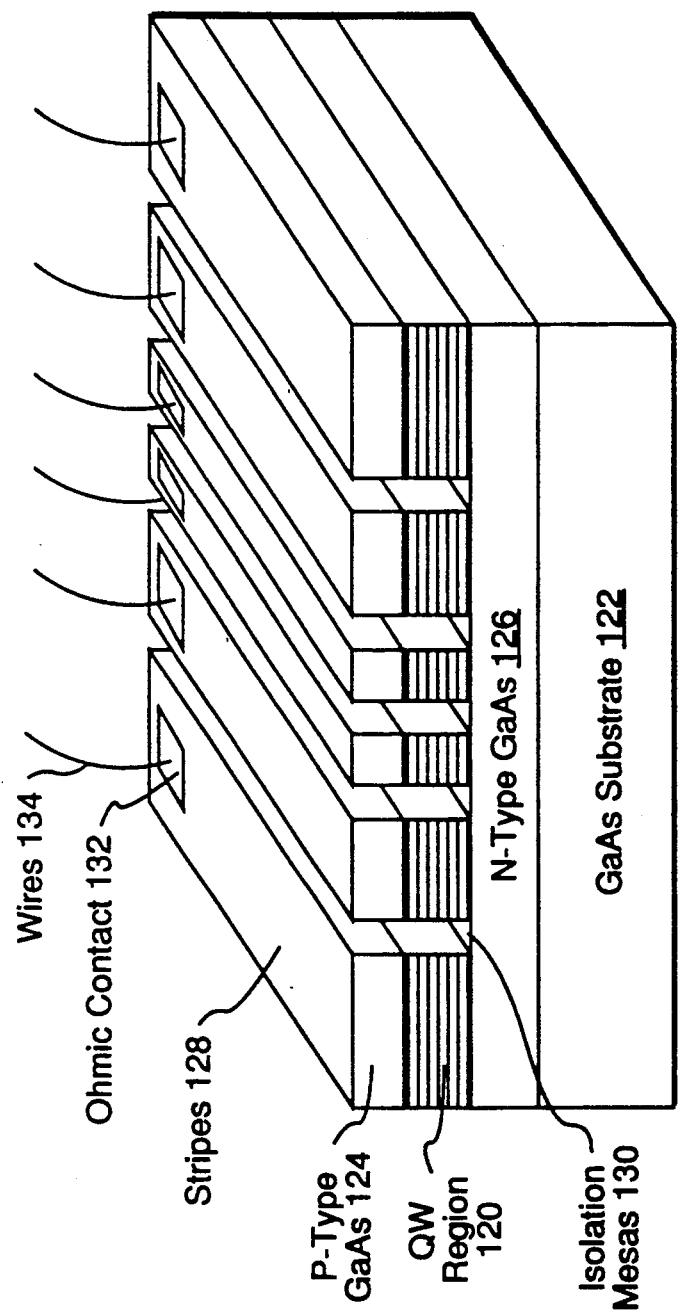
FIG. 15 is a schematic of the invention employing stripes of different width to enhance the useful diffracted power.

Optimization can also be made in the definition of the active areas. It has previously been mentioned that the areas can be stripes for beam deflection in one dimension, or squares for control in two dimensions. In the above-described embodiment the active regions were equally spaced stripes of equal width. However, better efficiency can be obtained in a finite grating if the stripes are made uneven, the stripe width depending on the position of the stripe in the grating. This is schematically shown in FIG. 15. The same applies to a two-dimensional grid for both horizontal and vertical control; the size of the individual squares could be dependent on the position of the square to increase efficiency.

Figure 16:
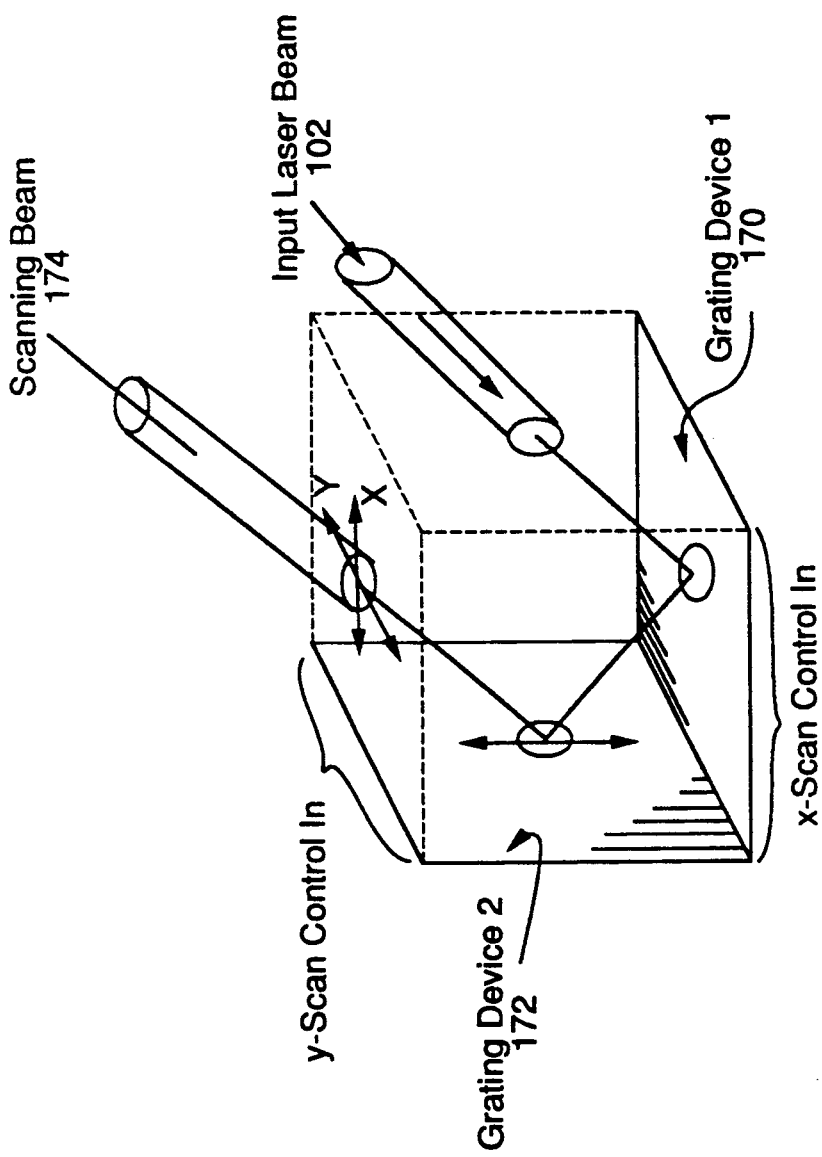
FIG. 16 is a schematic demonstrating how beam deflection by two devices results in two dimensional control of the beam.

Two-dimensional control of the beam can also be obtained by using two gratings. The first grating device would enable control in one direction, while the other would deflect in a perpendicular direction to the first. This embodiment is schematically shown in FIG. 16. The incoming light beam 102 is first deflected by a first device 170 which controls the deflection in the x direction. The reflected beam then falls upon a second device 172 which controls deflection in the y direction. Consequently, with 2 inputs deflection can be controlled in both directions. The situation is analogous to two sets of galvanic mirrors used to get both up and down, and left and right control of a laser beam.

Figure 17:
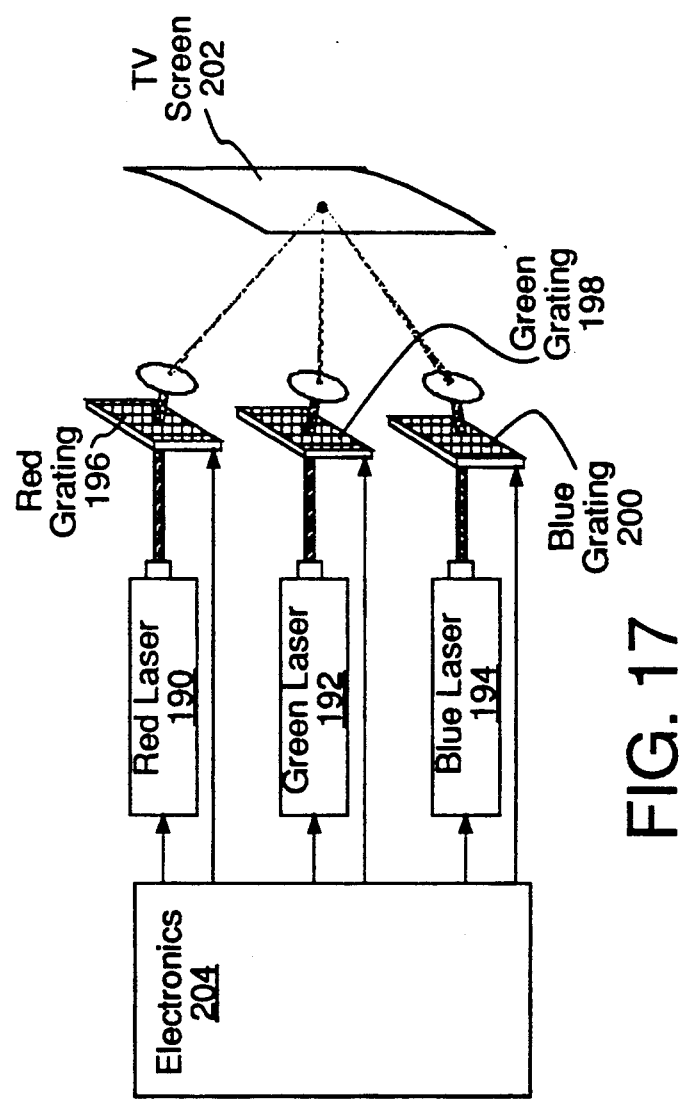
FIG. 17 is a schematic showing the use of the invention in producing a television picture.
Figure 18:
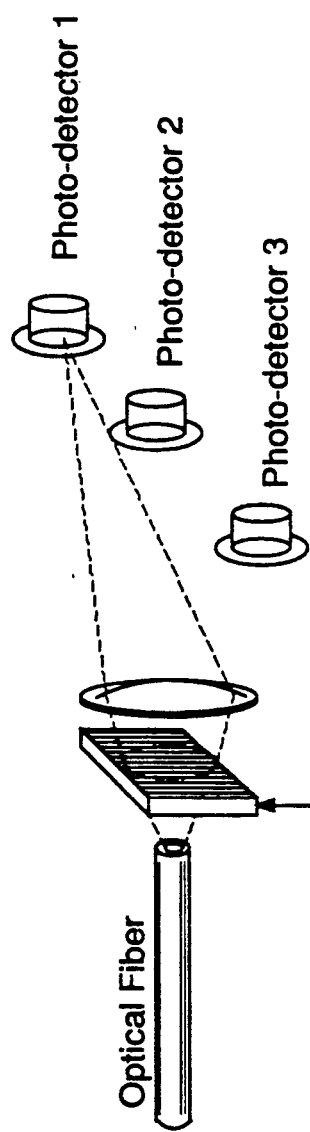
FIG. 18 is a schematic showing the use of the invention as an optical demultiplexer.
Figure 19:
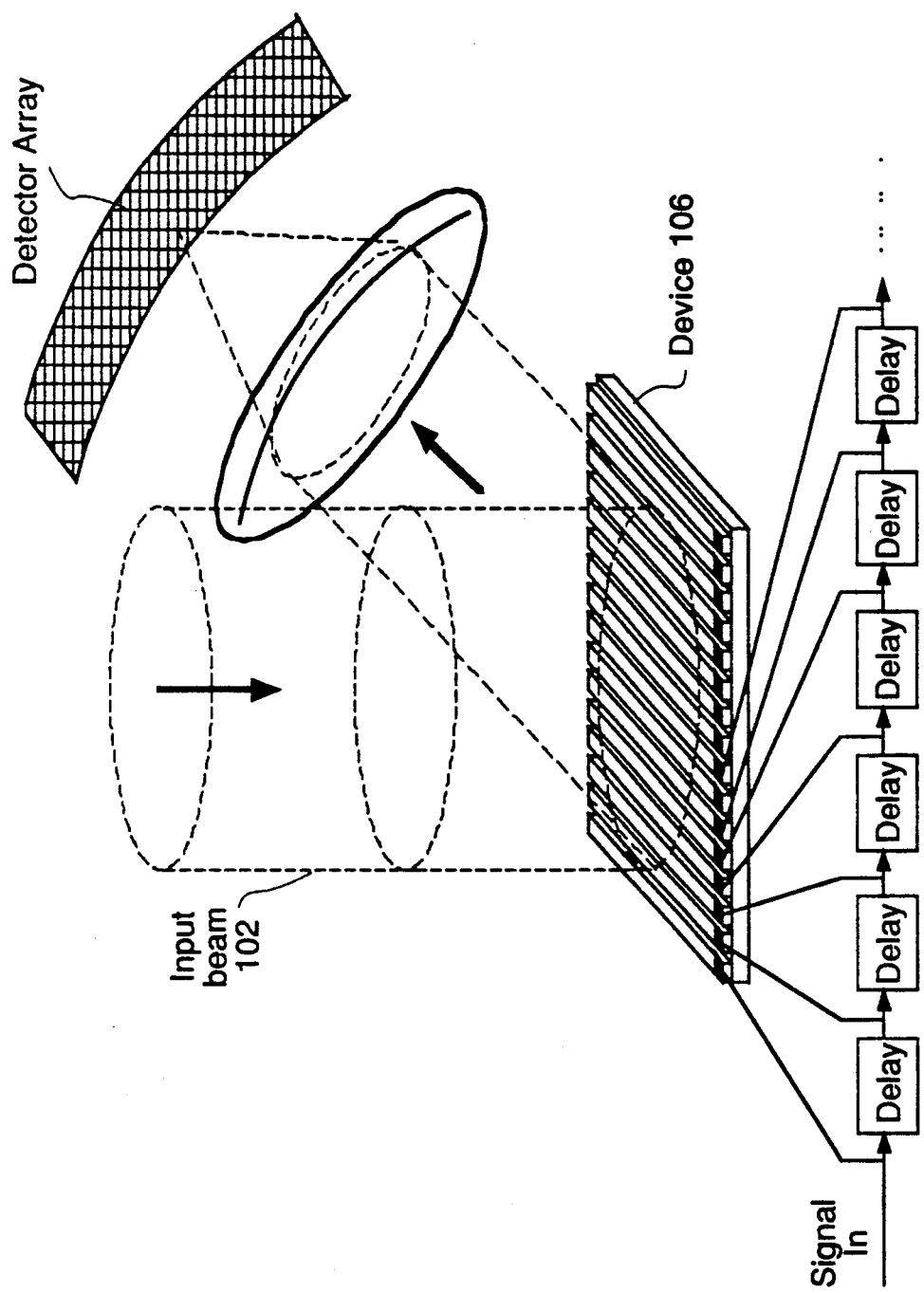
FIG. 19 shows how the device can be used as a spectrum analyzer.

The main application for this invention is steering laser beams. It can be used in producing graphics, such as in laser printers, or controlling a scanning laser beam to produce a dynamic image, such as a TV picture. For applications where a visible image is produced, lasers are required in the visible, as well as material that can modulate the intensity or the phase of visible light. To produce a color image for a TV, a red, green, and a blue laser and gratings are required. A typical set up for such a system is shown in FIG. 17. The red laser 190, the green laser 192 and the blue laser 194 are directed at their own respective beam steering devices 196, 198, and 200 respectively. The beams then pass through focusing lenses and fall upon a screen 202. The intensity of the laser beams and the deflection angles are controlled by electronic circuits 204. In this way a high resolution composite color image can be produced. The invention can also be used in optical switching, for example directing a single incoming beam to a number of output detectors or fibers. This could have applications in digital or analog information demultiplexing, such as in a telephone switching or optical computer networks. FIG. 18 is a schematic diagram for how this invention can be used to demultiplex information from an optical fiber bundle and send the data to different photodetectors. The property that the far-field is a Fourier Transform of the spatial variance of the device also has a host of applications. It could be used in signal processing, for example in obtaining a fast frequency scan of radar signals. FIG. 19 is a schematic of this implementation. The incoming beam 102 is once again deflected by the grating device and focused onto a detector array. Since the deflection angle depends on the spatial frequency of the device reflectivity, we obtain a spatial representation of the signal's spectrum. To translate the time varying incoming signal to spatial variance, a series of delay units can be used. As well as the one-dimensional transform used in signal processing, two-dimensional transforms can be performed with an array such as that sketched in FIG. 4. These have applications in image processing and image recognition as well as many other areas.

Though reflection mode devices produce the best contrast and reflectivity change, transmission mode devices are easier to apply due to the simpler geometry. All the previous applications mentioned above can be performed either with transmission mode or reflection mode devices. A dual transmission mode device combination is shown in FIG. 20 wherein two grating devices are used one after another to first steer the beam horizontally, and then vertically This enables x-y scanning without complex alignment of the gratings Materials for making this grating device may include ternaries or quarternaries such as InGaAlAs, InGaAsP, InGaAs, InAlAs and other semiconducting materials such as InP. For example, alloys or compounds made of Group III-V elements and Group II-VI elements are particularly useful for this device. For devices working in the reflection mode, mirrors may also be made of the previously listed materials, or dielectrics such as $ZrO_2$, $Ti_2z$, or metal films such as gold or aluminum. They can be made in single layers, or using ¼ wave stacks as previously mentioned.

What is claimed is:

1. An optical device comprising a semiconductor quantum well structure having a plurality of defined areas forming a diffraction grating and to which separate biasing voltages can be individually applied to modulate the intensity or phase of coherent light intercepting said structure and diffracted thereby, whereby changes in the far-field pattern produced by the diffracted light can be obtained by changing the biasing voltages applied to said areas.

2. An optical device as recited in claim 1 wherein said device is configured to operate in a transmission mode.

3. An optical device as recited in claim 1 wherein said device is configured to operate in a reflection mode.

4. An optical device as recited in claim 1 wherein said areas are configured to form a plurality of separated elongated stripes disposed parallel to each other.

5. An optical device as recited in claim 4 wherein the widths of said stripes are varied in a predetermined manner across said region.

6. An optical device as recited in claim 1 wherein said areas are geometrically configured and arranged in an orthogonal array such that by selectively applying particular potentials to various combinations of said areas, said diffracted light can be steered in two axial directions.

7. An optical device as recited in claim 6 wherein the dimensions of the respective areas vary across said region in at least one direction.

8. An optical device as recited in claim 1 wherein electrical control means is integrally formed with said quantum well structure on a common substrate.

9. An optical device as recited in claim and further comprising a partially reflecting mirror disposed in spaced apart parallel relationship to said quantum well structure along the path of said intercepting light to form an external Fabry-Perot cavity.

10. An optical device as recited in claim 1 and further comprising a plurality of integrated resistors respectively associated with each said area to form SEEDs, thereby allowing an optical input applied to said SEEDs to determine the biasing voltage applied to each said area.

11. An optical device as recited in claim 1 and further comprising a CCD means including a plurality of cells each respectively corresponding to one of said areas and operatively associated therewith to allow optical addressing of each such area.

12. An optical device as recited in any of claims 1-5 or 8-11 and further comprising a second quantum well structure similar to said first mentioned quantum well structure but oriented to lie in a plane normal to the plane including said first mentioned structure and in the path of said diffracted light, whereby the biasing voltages applied to said first mentioned structure steer said diffracted light in the direction of one scan axis, and the biasing voltages applied to said second structure steer said diffracted light along a second scan axis.

13. An optical device as recited in any of claims 1-5 or 8-11 and further comprising a second quantum well structure similar to said first mentioned structure but lying in a plane parallel to but spaced from the plane in which said first mentioned structure resides and in the path of said diffracted light, said second structure differing from said first mentioned structure in that its areas and biasing means are configured to diffract said light in a direction different from that of said first mentioned structure.

14. An optical diffraction grating device comprising:
a semiconductor body having formed therein a region of quantum well material spatially segregated into a plurality of quantum well substructures having optical properties determined by electric fields created therein; and
means for applying selected bias voltages to each said substructure to create said electric fields and to thus control the far-field pattern of coherent light impinging on said device and diffracted thereby.

15. An optical diffraction grating device as recited in claim 14 wherein at least one dimension of said substructures is on the order of the wavelength of said coherent light.

16. An optical grating device comprising:
a semiconductor body forming a quantum well structure divided into a plurality of discrete relatively isolated areas; and
means for selectively applying bias voltages to each said area to independently modulate the intensity or phase of light diffracted thereby, whereby changes in the far-field pattern produced by the diffracted light can be controlled by changing the respective bias voltages.

17. An electrically steerable laser source means comprising:
laser means for generating a beam of coherent radiation;
beam steering means disposed to be intercepted by said beam and including a substrate having a semiconductive quantum well region formed thereon, said region being subdivided into a plurality of quantum well substructures electrically isolated from each other to form a diffraction grating, each said substructure having electrode means associated therewith for receiving an applied electrical potential to create an electric potential field therein which modulates a portion of said beam to which it is exposed; and electrical control means for applying discrete electrical potentials to particular ones of said electrodes to select the optical properties of said grating and thereby cause the beam diffracted thereby to be selectively steered.

18. An electrically steerable laser source means as recited in claim 17 wherein said beam steering means is configured to operate in a transmission mode.

19. An electrically steerable laser source means as recited in claim 17 wherein said beam steering means is configured to operate in a reflection mode.

20. An electrically steerable laser source means as recited in claim 17 wherein said substructures are configured to form a plurality of elongated stripes disposed parallel to each other.

21. An electrically steerable laser source means as recited in claim 20 wherein the width of said stripes is varied in a predetermined manner across said region.

22. An electrically steerable laser source means as recited in claim 17 wherein said substructures are geometrically configured and arranged in an orthogonal array such that by selectively applying particular potentials to various combinations of said substructures, said diffracted beam can be steered in two axial directions.

23. An electrically steerable laser source means as recited in claim 22 wherein the respective surface areas of said substructures vary across said region in at least one direction.

24. An electrically steerable laser source means as recited in claim 17 wherein said electrical control means is integrally formed on said substrate.

25. An electrically steerable laser source means as recited in claim 17 and further comprising a partially reflecting mirror disposed between said laser means and said steering means and along the path of said beam to form an external Fabry-Perot cavity.

26. An electrically steerable laser source means as recited in claim 17 and further comprising a plurality of integrated resistors respectively associated with each said substructure to form SEEDs, thereby allowing an optical input applied to said SEEDs to determine the potential applied to each said substructure.

27. An electrically steerable laser source means as recited in claim 17 and further comprising a CCD means including a plurality of cells each respectively corresponding to one of said substructures and operatively associated therewith to allow optical addressing of each such substructure.

28. An electrically steerable laser source means as recited in any of claims 17–21 or 24–27 and further comprising a second beam steering means similar to said first mentioned beam steering means but oriented to lie in a plane normal to the plane including said first mentioned steering means and in the path of said diffracted beam, whereby potentials applied by said electrical control means to said first mentioned steering means steer said diffracted beam in the direction of a first scan axis, and potentials applied to said second steering means steer said diffracted beam along a second scan axis.

29. An electrically steerable laser source means as recited in any of claims 17–21 or 23–27 and further comprising a second beam steering means similar to said first mentioned beam steering means but positioned to lie in a plane spaced from and parallel to the plane including said first mentioned steering means and in the path of said diffracted beam, said second beam steering means being oriented such that potentials applied by said electrical control means to said first mentioned steering means steer said diffracted beam in the direction of a first scan axis, and potentials applied to said second steering means steer said diffracted beam along a second scan axis.

30. An electrically steerable laser source means for use in a video monitor or the like including a luminous screen or an array of optical detectors illuminated in raster scan fashion by a beam of light, comprising:

laser means for generating a beam of coherent radiation;

first beam steering means disposed to be intercepted by said beam and including a substrate having a semiconductive quantum well region formed thereon, said region being subdivided into a plurality of quantum well substructures electrically isolated from each other to form a diffraction grating, each said substructure having electrode means associated therewith for receiving an applied electrical potential to create an electric potential field therein which modulates a portion of said beam to which it is exposed;

a second beam steering means similar to said first beam steering means but oriented to lie in a plane normal to the plane including said first steering means and in the path of said diffracted beam; and electrical control means for applying discrete electrical potentials to particular ones of said electrodes of said first steering means to steer said diffracted beam in the direction of a first scan axis, and to particular ones of said electrodes of said second steering means to steer said diffracted beam in the direction of a second scan axis.

31. An electrically steerable laser source means for use in a video monitor or the like including a luminous screen or an array of optical detectors illuminated in raster scan fashion by a beam of light, comprising:

laser means for generating a beam of coherent radiation;

first beam steering means disposed to be intercepted by said beam and including a substrate having a semiconductive quantum well region formed thereon, said region being subdivided into a plurality of quantum well substructures electrically isolated from each other to form a diffraction grating, each said substructure having electrode means associated therewith for receiving an applied electrical potential to create an electric potential field therein which modulates a portion of said beam to which it is exposed;

a second beam steering means similar to said first beam steering means but positioned to lie in a plane spaced from and parallel to the plane including said first steering means and in the path of said diffracted beam, said second beam steering means being oriented such that it diffracts said beam in a direction normal to the diffraction of said first beam steering means; and electrical control means for applying discrete electrical potentials to particular ones of said electrodes of said first steering means to steer said diffracted beam in the direction of a first scan axis, and to particular ones of said second electrodes of said steering means to steer said diffracted beam in the direction of a second scan axis.

* * * * *